(12) United States Patent
Kubo et al.

(10) Patent No.: US 7,574,402 B2
(45) Date of Patent: Aug. 11, 2009

(54) SYSTEM AND METHOD FOR AUTHORIZING ELECTRONIC PAYMENT TRANSACTIONS

(75) Inventors: Takayuki Kubo, Herrenberg (DE); Norbert Albrecht, Berlin (DE)

(73) Assignee: First Data Corporation, Greenwood Village, CO (US)

( * ) Notice: Subject to any disclaimer, the term of this patent is extended or adjusted under 35 U.S.C. 154(b) by 56 days.

(21) Appl. No.: 11/539,529

(22) Filed: Oct. 6, 2006

(65) Prior Publication Data

US 2007/0246528 A1    Oct. 25, 2007

(30) Foreign Application Priority Data

Oct. 12, 2005    (WO) ............... PCT/EP2005/010965

(51) Int. Cl.
*G06Q 40/00*    (2006.01)
(52) U.S. Cl. ...................... 705/38; 705/39; 706/925
(58) Field of Classification Search ............... 705/44, 705/38, 39; 706/925
See application file for complete search history.

(56) References Cited

U.S. PATENT DOCUMENTS

| | | | | |
|---|---|---|---|---|
| 5,287,269 A | * | 2/1994 | Dorrough et al. | 705/17 |
| 5,345,595 A | * | 9/1994 | Johnson et al. | 455/410 |
| 5,619,620 A | * | 4/1997 | Eccles | 706/20 |
| 6,018,723 A | * | 1/2000 | Siegel et al. | 705/38 |
| 6,119,103 A | * | 9/2000 | Basch et al. | 705/35 |

(Continued)

FOREIGN PATENT DOCUMENTS

EP    418144 A  *  3/1991

(Continued)

OTHER PUBLICATIONS

Leonard, Kevin, The Development of a Rule Based Expert System Model for Fraud Alert in Consumer Credit, 1995, European Journal of Operational Research, Issue 80, pp. 350-356.*

(Continued)

*Primary Examiner*—Susanna M Diaz
*Assistant Examiner*—Ann Loftus
(74) *Attorney, Agent, or Firm*—Townsend and Townsend and Crew LLP

(57) ABSTRACT

A transaction authorization system comprises an authorization engine (22) configured to perform an analysis in relation to a received request for authorization of an electronic payment transaction and determine an authorization output based on the analysis, wherein the analysis includes application of one or more checking rules of the if-then clause type comparing one or more transaction-related attributes to one or more predefined attribute threshold values. The system further includes a database system (24) storing transaction records for a plurality of past electronic payment transactions, an evaluation engine (28) configured to access the database system (24) and evaluate a first set of stored transaction records to determine one or more characteristic values related to the first set, and a setting engine (26) configured to access the database system (24) and select a second set of stored transaction records in accordance with at least one of the one or more characteristic values, wherein the setting engine (26) is further configured to evaluate the selected second set of transaction records and set at least one attribute threshold value in at least one checking rule based on the evaluation of the second set of transaction records.

17 Claims, 1 Drawing Sheet

U.S. PATENT DOCUMENTS

Figure 1:
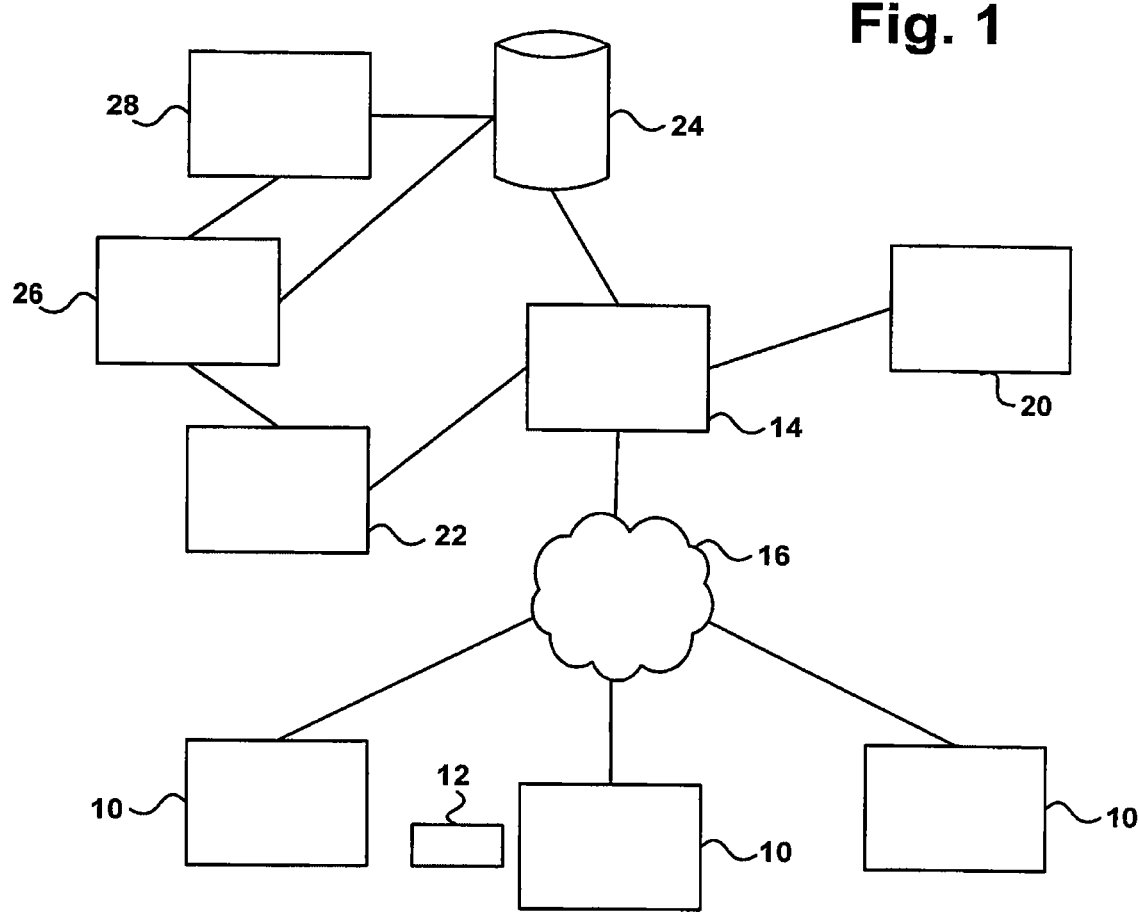

| | | | |
|---|---|---|---|
| 6,330,546 B1 * | 12/2001 | Gopinathan et al. | 705/35 |
| 6,598,030 B1 * | 7/2003 | Siegel et al. | 705/38 |
| 6,658,393 B1 * | 12/2003 | Basch et al. | 705/38 |
| 6,868,413 B1 * | 3/2005 | Grindrod et al. | 706/59 |
| 6,904,409 B1 * | 6/2005 | Lambert et al. | 705/10 |
| 7,314,166 B2 * | 1/2008 | Anderson et al. | 235/380 |
| 7,373,311 B2 * | 5/2008 | Lambert et al. | 705/10 |
| 7,512,583 B2 * | 3/2009 | Benson et al. | 706/59 |
| 2002/0099649 A1 * | 7/2002 | Lee et al. | 705/38 |
| 2002/0194119 A1 * | 12/2002 | Wright et al. | 705/38 |
| 2003/0130919 A1 * | 7/2003 | Templeton et al. | 705/35 |
| 2003/0195840 A1 * | 10/2003 | Xu | 705/38 |
| 2003/0208439 A1 * | 11/2003 | Rast | 705/38 |
| 2004/0236696 A1 * | 11/2004 | Aoki et al. | 705/50 |
| 2005/0086166 A1 * | 4/2005 | Monk et al. | 705/41 |
| 2005/0091116 A1 * | 4/2005 | Monk | 705/17 |
| 2005/0097320 A1 * | 5/2005 | Golan et al. | 713/166 |
| 2005/0114217 A1 * | 5/2005 | Monk | 705/17 |
| 2005/0149455 A1 * | 7/2005 | Bruesewitz et al. | 705/64 |

FOREIGN PATENT DOCUMENTS

| | | |
|---|---|---|
| WO | WO03/085581 | 10/2003 |

OTHER PUBLICATIONS

Fraykus, Preston., Western Banking Magazine: "How to Protect Against Debit Card Fraud? Integrating Proactive Solutions to Mitigate Loss", Internet, Dec. 2003.

* cited by examiner

SYSTEM AND METHOD FOR AUTHORIZING ELECTRONIC PAYMENT TRANSACTIONS

The present invention relates to a system and method for authorizing electronic payment transactions.

As used herein, the term "payment transaction" is to be understood as referring to an action or set of actions having as its goal the electronic transfer of money or other values from a payor's account to a payee's account. "Electronic transaction" means a transaction that is conducted, in whole or in part, by electronic means or electronic records. The transaction may be conducted using wireless and/or wired communications technology. For example, the Internet, a public switched telephone network, a wide area network, a local area network, a virtual private network, and other types of communications networks and/or links may be involved in performing an electronic payment transaction.

Electronic payment transactions frequently require authorization by a designated entity prior to execution of the transaction. The authorization entity may perform some form of analysis related to the requested transaction and, depending on the result of the analysis, render a decision whether to decline or authorize the payment transaction. The quality of the analysis is determinative of the error rate of the decision. That is, the better the analysis, the smaller the number of transactions that were erroneously approved and also the smaller the number of transactions that were erroneously declined.

Erroneous decisions by a payment transaction authorization entity may give rise to increased signal traffic and data processing. For example, erroneous approval of a payment transaction request may result in reversal of the authorized transaction after execution thereof. Reverse transactions stemming from erroneous authorizations cause additional signal traffic and consume additional processing time and resources in the communications and data processing infrastructure used for processing the electronic payment transactions. In view of the finite computing and routing capacity of existing computer network systems, there is a high desire to keep unnecessary signal traffic and data processing caused by erroneous decisions of a payment transaction authorization entity low.

It is therefore an object of the present invention to provide a transaction authorization system and method which allow to achieve improved decision reliability to thereby prevent increased load on existing computing and network resources.

To achieve the above object, the present invention provides a transaction authorization system, comprising:
  an authorization engine configured to perform an analysis in relation to a received request for authorization of an electronic payment transaction and determine an authorization output based on the analysis, the analysis including application of one or more checking rules of the if-then clause type comparing one or more transaction-related attributes to one or more predefined attribute threshold values,
  a database system storing transaction records for a plurality of past electronic payment transactions,
  an evaluation engine configured to access the database system and evaluate a first set of stored transaction records to determine one or more characteristic values related to the first set, and
  a setting engine configured to access the database system and select a second set of stored transaction records in accordance with at least one of the one or more characteristic values, wherein the setting engine is further configured to evaluate the selected second set of transaction records and set at least one attribute threshold value in at least one checking rule based on the evaluation of the second set of transaction records.

The present invention also provides a transaction authorization method, comprising:
  receiving a request for authorization of an electronic payment transaction,
  performing an analysis in relation to the received authorization request and determining an authorization output based on the analysis, the analysis including application of one or more checking rules of the if-then clause type comparing one or more transaction-related attributes to one or more predefined attribute threshold values,
  accessing a database system storing transaction records for a plurality of past electronic payment transactions,
  evaluating a first set of stored transaction records to determine one or more characteristic values related to the first set,
  selecting a second set of stored transaction records in accordance with at least one of the one or more characteristic values,
  evaluating the selected second set of transaction records and
  setting at least one attribute threshold value in at least one checking rule based on the evaluation of the second set of transaction records.

The term "engine" as used herein refers to a mechanism implemented by suitable hardware and/or software and designed to perform one or more predefined processes in a computerized data processing environment.

In one embodiment of the present invention, the electronic payment transactions are card-initiated transactions where "card" refers to a card-shaped means of making electronic payments. Debit cards and credit cards are conventionally known examples of payment cards. The payment card may include, in computer-readable form, information identifying an account of the card holder. This information may be stored, e.g., in a magnetic strip provided on the card or a chip integrated into the card. Card terminals located at merchant sites may be configured to read the identification information from customer's payment cards.

Various payment methods have been devised and implemented on the basis of machine-readable payment cards. Among them, a signature-based electronic debit payment method and an identification code-based electronic debit payment method have attained widespread acceptance by market participants.

In identification code-based debit payment, the card holder enters a personal identification number (PIN) into a keypad or keyboard of a card terminal. In an online version of the PIN payment method, the PIN number is transmitted via an online connection to an electronic authorization center of the card issuing bank along with such information as an account identifier identifying the card holder's account and the amount due. The bank's authorization center checks the PIN number and also whether the account has sufficient funds to collect the requested amount. If the card is valid and sufficient funds are available, the authorization center effects payment, and an "ok" message is sent to the terminal. Otherwise, the authorization center declines payment. There is also known an offline version of PIN-based debit payment where the PIN number is checked by the card at the point of sale (POS) and may be checked, alternatively or additionally, by the authorization center of the card issuing bank at a later time not correlated with the time of input of the PIN by the card holder.

In signature-based debit payment, no PIN is entered by the card holder to confirm the payment. Instead, the card holder provides a signature on a receipt printed by the terminal. The terminal reads the card holder's account data from the card's magnetic strip or chip and stores the read information along with the amount due in a payment data set. This data set may thereafter be forwarded to the issuing bank of the debit card to collect the amount due from the card holder's account.

The above signature-based debit payment method may be enhanced by an online authorization check. To this end, the terminal sends a request message including the account data read from the debit card to an authorization entity which checks whether the requested transaction can be authorized. The authorization entity may hold a list of stolen or otherwise prohibited debit cards for which no payment approval must be allowed. Typically, the authorization entity has no access to account information of the card holders and thus has no knowledge as to whether or not a specific requestor's account holds sufficient funds. The authorization entity may be implemented on a remote computer system communicably coupled to the terminal via a wide area network, the Internet or a public telecommunications network, for example. Alternately, the authorization entity may be coupled to the terminal through a local are network, which may, e.g., be a proprietary computer network of a merchant.

A person versed in the art will readily understand that the above identification code-based and signature-based debit payment methods are not limited to card-shaped payment means, but can be used in connection with machine-readable payment means of any desired shape and size. The present invention is therefore not to be understood as being limited to payment cards, but envisages the use of differently shaped and sized, machine-readable payment means. One will also appreciate that a machine-readable payment means is just one example of a means for verifying a person's legitimation to act as a transaction participant. In other instances, identification data from a passport or similar identification item, a telephone number or biometric data as may be obtained from the eye or a finger tip may serve to legitimize a person as a rightful transaction participant. The particular source and manner of acquisition of any payor and/or payor account identification information as may be included in a transaction authorization request received by the system of the present invention is not relevant to the invention.

Moreover, while the transaction authorization system and method of the present invention are preferably intended for use in authorizing requests for signature-based debit payment transactions, a person of ordinary skill in the art will appreciate that the transaction authorization system and method of the present invention may also be useful in connection with other types of payment transactions, which may, or may not, rely on portable, machine-readable payment means. For example, there is known a cardless debit payment method in which a payor uses a graphical user interface displayed on a display device of a computer terminal to enter his or her account information and, possibly, additional data and confirms the payment electronically by clicking on a button or providing a digital signature. An electronic payment transaction occurring as part of such a cardless payment method may represent another embodiment of a payment transaction that can be authorized by the system and method of the present invention. It is further to be noted that the present invention may find application also with respect to payment methods other than debit payment methods. For example, it is conceivable to use the present invention for the authorization of cheque-based payment transactions.

An authorization system responsible for authorizing electronic payment transactions may have no, or no immediate, access to account information of a payor in the transaction. Decisions of the authorization system are then subject to uncertainty and may prove erroneous. For example, it may occur that an authorization system for signature-based debit payment transactions or other "PIN-less" payment transactions grants a payment request not knowing that the payor's account lacks sufficient funds. In such a case, a reverse transaction may follow in order to re-collect a balance that may have already been credited to the payee's account. It has been found that such reverse transactions may cause considerable signal traffic and consume considerable computing power in existing payment transaction processing infrastructure, which signal traffic and computing power could be saved and otherwise utilized if a more reliable authorization decision was available. Here, "authorization decision" generally refers to the decision output by the authorization system, whether positive, negative or anything between.

To achieve a more reliable authorization decision, the present invention provides a scheme for the automated determination of one or more attribute threshold values in one or more checking rules called upon in the process of examining an incoming authorization request for an electronic payment transaction. A checking rule as understood herein is an if-then clause type including a conditional "if" part and a consequential "then" part. The "if" part will typically include one or more threshold values relating to one or more transaction-related attributes. The "then" part specifies a consequence influencing the eventual authorization output. Exemplary transaction-related attributes include, but are not limited to, a transaction amount of a single payment transaction, an accumulated transaction amount of two or more payment transactions, a transaction time, a transaction date, a difference between the times or dates of two successive transactions, number of payment transactions, etc. One skilled in the art will be readily able to conceive of other transaction-related attributes.

To facilitate understanding of the checking rule concept, one checking rule may, for example, be defined as: "If the accumulated transaction amount of payment transactions for the same payor account as indicated in a currently received transaction authorization request in the last week exceeds €900,–, then decline the requested authorization." In this example, the value '€ 900,–' is a threshold value for the transaction-related attribute 'accumulated transaction amount'. Another exemplary checking rule may be defined as: "If the number of payment transactions for the same payor account as indicated in a currently received transaction authorization request within the last two days is equal to or greater than 4, then decline the requested authorization." Here, '4' is a threshold value for the transaction-related attribute 'number of payment transactions'. It will be appreciated that numerous other checking rules of the if-then clause type can be defined and implemented in a transaction authorization system according to the present invention. It will also be appreciated that the particular content of the checking rules is not relevant to the definition of the present invention, except for the fact that each checking rule addresses at least one transaction-related attribute and specifies one or more threshold values in relation to each transaction-related attribute.

One might consider setting the attribute threshold value(s) in the checking rule(s) intuitively. It has been found, however, that setting the attribute threshold values solely based on one's personal intuition will almost always lead to insufficient results in terms of authorization reliability. The present invention, conversely, adopts a strategic approach in determining suitable attribute threshold values, thereby rendering a better reliability of the authorization output. The solution according to the present invention is based on a double evaluation process of past electronic payment transactions, for which respective transaction records are stored in a database system. In a first phase of the evaluation process, a first set of stored transaction records is evaluated to determine one or more characteristic values related to the first set. In a subsequent phase of the evaluation process, a second set of stored transaction records is selected from the database system using the one or more characteristic values determined in the first evaluation phase as a selection criterion. Once selected, the second set of transaction records is evaluated to determine a suitable value for each attribute threshold of interest. It is to be noted that the first and second sets of transaction records may, or may not, partially or fully overlap. Specifically, it is conceivable that the second set of transaction records is completely included in the first set of transaction records. It is alternately conceivable that the first and second sets have no transaction records or only some transaction records in common.

Each transaction record in the database will include a plurality of data fields that may contain various transaction-related information. One of the data fields may include a payor account identifier. One or more other data fields may serve to include information on an outcome of the transaction such as if the transaction was authorized or rejected and/or if it could be completed successfully and/or if it was annulled through a reverse transaction. In a more refined embodiment, the information on the transaction outcome may specify for a rejected or reversed transaction a reason of rejection or reversal. Additional data fields may serve to contain such transaction parameters as a time of the respective transaction, a date of the respective transaction, a payment amount of the respective transaction, an identification code of a terminal from which the respective transaction was requested, a merchant code, a country code, etc.

In a preferred embodiment of the present invention, the one or more characteristic values include one or more correlation values indicative of a temporal correlation length relating to the transaction outcome of successive payment transactions for the same payor account in the first set of transaction records. It has been found that from a statistical viewpoint a causal relationship between the transaction outcomes of successive transactions for the same payor account can be observed in many cases. It has been further observed that this causal relationship depends on the time difference between the transactions considered. Specifically, it has been found that the closer two payment transactions for the same payor account follow upon each other, the stronger is typically the correlation between their transaction outcomes. A characteristic temporal correlation length can then be determined for the attribute 'transaction outcome' through an analysis of the transaction outcome data field(s) in the transaction records of the first set. By selecting the second set of transaction records so as to minimally span a time period that corresponds to the temporal correlation length thus determined, the present invention is able to ensure that a meaningful set of transaction records is selected as a basis for the determination of the one or more attribute threshold values.

To determine a characteristic temporal correlation length, one or more transaction outcome correlation functions may be determined in relation to the first set of transaction records A characteristic magnitude of the one or more transaction outcome correlation functions can then be conveniently set as a respective correlation value. The one or more transaction outcome correlation functions can be determined by approximation of a transaction outcome correlation distribution obtained from an analysis of the records of the first set using one or more of such approximation techniques as exponential fitting, Gaussian fitting, power-law fitting etc. These fitting techniques are known in the art per se and need not be explained in detail herein. One will appreciate that any correlation function thus determined through approximation will have one or more characteristic magnitudes that are specific of the respective correlation function. With an exponential approximation function, for example, the half-decay length can be used as a characteristic magnitude. With a Gaussian approximation function, the standard variation can be used as a characteristic magnitude, for example.

While it is one embodiment within the scope of the present invention to determine one or more characteristic values in relation to a single first set of transaction records only, a preferred embodiment provides that a plurality of first sets of transaction records are selected from the database system and one or more characteristic values are determined in relation to each selected first set. The plurality of first sets may be selected so as to reflect different industry sectors or merchant categories, for example. In this way, different shopping behaviors, different price levels, and different payment circumstances in different industry sectors or merchant categories can be taken into account. For example, shoppers will typically shop at groceries stores several times a month, each time spending only a relatively small amount of money, whereas they may shop at furniture warehouses, where the items of furniture can be a lot more expensive, only once a year or even less often. Further, while a furniture dealer may grant a credit to a customer, allowing him to pay a piece of furniture in several installments over an extended period of time, a supermarket typically offers no such option, requiring shoppers to make a full payment all at once. One will easily appreciate that suchlike different shopping behaviors, price levels, and payment circumstances may translate into different characteristic values for different sets of transaction records that belong to different industry sectors or merchant categories. It is to be understood, however, that additional or alternative selection criteria for the transaction records of the first sets may be applicable.

In order to determine an attribute threshold value for a specific checking rule, selection of the transaction records of the second set is then on the basis of one or more characteristic values determined in relation to a selected one of the first sets of transaction records. Selection of one of the first sets may, e.g., be in accordance with an industry sector or merchant category for which the specific checking rule is to be designed or, alternately, in accordance with the industry sector or merchant category of a merchant for which the specific checking rule is to be designed. To identify an industry sector or merchant category in a transaction record, the record may have at least one data field containing information identifying directly or indirectly a payee in the respective transaction or the industry sector or merchant category to which the payee belongs. A terminal identification code uniquely identifying a terminal that generated an authorization request and transmitted the same to the transaction authorization system may allow identification of the merchant in possession of the terminal, and hence the merchant's industry sector or merchant category, for example.

Advantageously, the plurality of first sets of transaction records may be re-selected at predetermined time intervals and/or whenever a predetermined number of transaction records have been newly recorded in the database system, and the one or more characteristic values may be re-determined in relation to each re-selected set.

As indicated further above, different types of payment transactions may exist. The present invention provides in one embodiment that the analysis including the one or more checking rules is applied in relation to authorization requests for first-type payment transactions, while the transaction records stored in the database system include transaction records for second-type payment transactions. In such a case, the one or more first sets and/or the second set of transaction records may be selected so as to include records for second-type payment transactions. In particular, these sets may be exclusively formed of transaction records for second-type payment transactions. Alternately, at least one of the first set(s) and second set may be formed to include at least some transaction records for first-type payment transactions. A signature-based debit payment transaction as discussed hereinabove is a preferred first-type payment transaction and an identification code-based debit payment transaction may be one example of a second-type payment transaction.

One will understand that in alternate embodiments the database system may only contain transaction records for payment transactions of the same (first) type as are analyzed by the authorization engine. One will also understand that in such alternate embodiments the first and second sets will be solely made up of transaction records relating to payment transactions of this single type. In yet other embodiments, the database system may contain transaction records for payment transactions of the first type and at least one second type. In such a case, the present invention provides flexibility with regard to the transaction type used for forming the first and second sets of transaction records. Specifically, it is conceivable that at least one of the first and second sets are selected so as to include records for transactions of different types.

The transaction records for second-type payment transactions may each include a transaction request answer code generated by a remotely located further transaction authorization system. The first set or sets may then be evaluated by referring to the transaction request answer code in transaction records for second-type payment transactions included in the first set(s). Further, the selected second set may likewise be evaluated by referring to the transaction request answer code in transaction records for second-type payment transactions included in the selected second set.

As for the determination of the attribute threshold value(s), this can be achieved by determining one or more conditional probabilities in relation to the selected second set and setting the at least one attribute threshold value based on the one or more conditional probabilities, wherein the conditional probabilities are indicative of a probability of one or more realizations of one or more first transaction-related parameters under the condition of one or more realizations of one or more second transaction-related parameters.

A computer-readable information storage medium in accordance with the present invention includes stored program code means adapted to effect, when executed by a computer system, execution of the methodology discussed above. The information storage medium may, e.g., be in the form of an optical or magnetic disk storing the program code means. The program code means can also be available in the form of a signal transmitted in a communications system. The signal may be an electric or electromagnetic signal transmitted through wired or wireless media and representing a sequence of instructions forming the program code means. The present invention is further intended to provide protection for a computer program product including program code means adapted to effect, when executed by a computer system, execution of the methodology discussed above.

Figure 2:
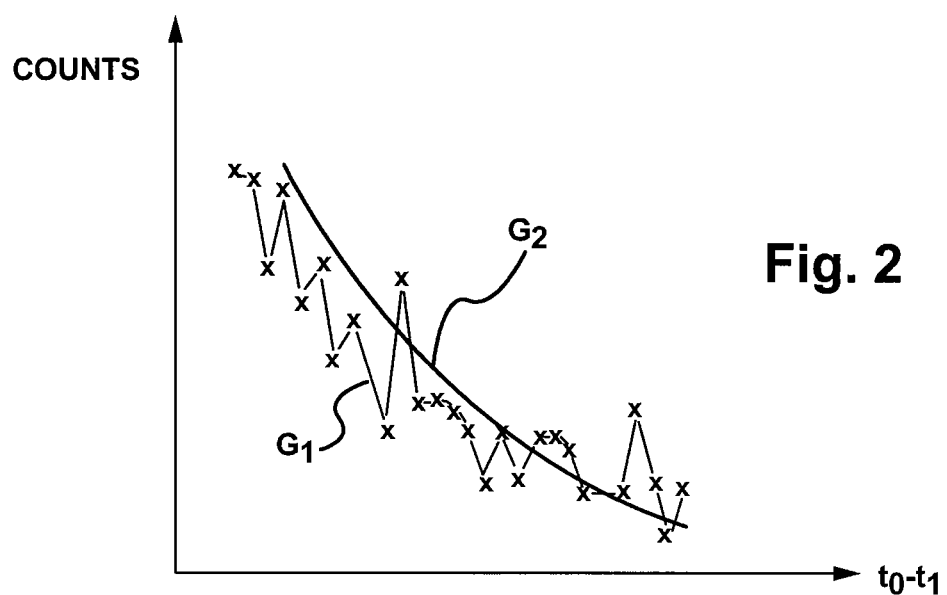

The invention will be explained further by way of non-limiting and purely illustrative example in conjunction with the accompanying drawings, in which:

FIG. 1 illustrates a schematic block diagram of a portion of an exemplary architecture for processing electronic card payment transactions; and FIG. 2 schematically shows an exemplary transaction outcome correlation distribution and an exponential approximation function.

In FIG. 1, a plurality of card terminals 10 are depicted, which are configured to read stored information from a payment card such as schematically indicated at 12. The terminals 10 may be located at the site of one or more merchants. In a debit payment method, the read information may include account data consisting of an account number of the holder of the card and a bank identification code. The terminals 10 are communicably coupled to a host server 14 across a communications network 16. The host server 14 is communicably coupled to a first authorization system 18 and one or more second, remotely located authorization systems 20.

The communications network 16 may include, e.g., at least one of a land-line public switched telephone network, a mobile communications network such as according to the GMS or UTMS standard or any other conventionally known mobile communications standard, the Internet, a proprietary communications network, a wide area network, etc.

The first authorization system 18 includes an authorization engine 22 destined and configured to check incoming authorization requests for first-type payment transactions. The one or more second authorization systems 20 are destined and configured to check incoming authorization requests for second-type payment transactions. The first-type and second-type payment transactions represent alternative ways of transferring a payment amount. The following description specifically envisages a scenario where the first-type payment transactions are signature-based debit card payment transactions and the second-type payment transactions are PIN-based debit card payment transactions. In such a scenario, the first authorization system 18 may have no access to account information of debit card holders, while the one or more second authorization systems 20 have access to such account information, enabling them to determine whether a requested payment amount can be collected from a card holder's account.

One or more of the card terminals 10 may be configured to support signature-based debit card payment transactions only. One or more other card terminals 10 may be configured to support PIN-based debit card payment transactions only. Some of the card terminals 10 may be configured to support both signature-based debit card payment transactions and PIN-based debit card payment transactions.

In a signature-based debit card payment method with online authorization, a terminal 10 reads account data from a debit payment means such as, e.g., a debit card and establishes a communication connection with the host server 14. The terminal transmits an authorization request message to the host server 14 via the communication connection. Included in the authorization request message is the account data read from the debit card and possibly further information. The host server 14 receives the authorization request message and forwards it to the first authorization system 18. The authorization engine 22 in the first authorization system 18 checks the authorization request online and returns a response message, which is transmitted via the host server 14 to the requesting terminal 10. The response message includes an authorization decision based on the result of the analysis performed by the authorization engine 22.

After receipt of the response message from the first authorization system 18, the terminal 10 or host server 14 may transmit a debit data set including all relevant transaction data to a bank's payment processing system to settle the outstanding debt. In case of insufficient funds on the card holder's account, the card issuing bank may electronically decline to debit the balance due to the card holder's account. This may result in the merchant's bank annulling a credit it may already have posted on the merchant's account. It will be easily appreciated by one of ordinary skill in the art that the signal traffic involved in such a reverse transaction could be avoided if the authorization decision of the authorization engine 22 was more reliable.

In a PIN-based debit card payment method, a terminal 10 similarly transmits an authorization request message to the host server 14. The authorization request message additionally includes a PIN input by the card holder at the terminal. The host server 14 is programmed to route the message to the second authorization system 20 (or, if plural second authorization systems 20 are provided, a selected one of the plural systems). The second authorization system 20 checks the PIN and also whether the card holder has sufficient funds in his or her account. It returns a response message, which is transmitted via the host server 14 to the requesting terminal. The response message contains information as to whether or not the requested transaction is approved or rejected. Such information may be in the form of an answer code, the value of which indicates the specific answer or decision by the second authorization system 20.

There may be defined a plurality of different answer codes. For example, an answer code 'AA' may indicate successful completion of the requested payment. An answer code 'AB' may indicate that the presented card is not registered with the bank operating the addressed second authorization engine. An answer code 'AC' may indicate that the bank identification code included in the transmitted information is not valid. An answer code 'AD' may indicate that the payment amount is inadmissibly high. An answer code 'AE' may indicate that the addressed second authorization engine has reason to assume some form of manipulation of the card. An answer code 'AF' may indicate that an incorrect PIN has been input. An answer code 'AG' may indicate that the card has expired. An answer code 'AH' may indicate a blocked card. An answer code 'AI' may indicate that an incorrect PIN has been input a maximum allowable number of, say, three times in a row. The answer codes 'AB' through 'AI' indicate rejection of the requested PIN-based payment transaction for one or the other reason, whereas answer code 'AA' indicates that the requested transaction was authorized.

It is to be understood that the above answer codes are merely given by way of example and are not intended to be limiting to the present invention. There may be defined numerous other answer codes having different meanings. The present invention envisages the use of answer codes that follow standard convention in the industry.

A database system 24 is shown in FIG. 1 which stores a history log of at least some of the debit card payment transactions processed via the host server 14. The transactions recorded in the database 22 system preferably include both PIN-based payment transactions and signature-based payment transactions. In one alternative embodiment, the transactions recorded in the database system 24 may include only records for signature-based payment transactions. In the following discussion, however, it is assumed that at least part of the transaction records in the database system 24 are for PIN-based payment transactions. The database system 24 may be maintained at least in part by the host server 14, which may update the database system 24 whenever it receives an authorization request message for a new PIN-based or signature-based debit payment transaction.

The history log in the database system 24 comprises a transaction record for each registered payment transaction. Each transaction record includes a plurality of transaction parameters related to the respective payment transaction. These parameters may include the transaction time, transaction date and transaction amount, a merchant type (category) code, a merchant country code, a location of the requesting terminal, a terminal identification code, etc. Each terminal 10 has its own unique terminal identification code, which it transmits as part of a transaction authorization request whenever a payment transaction is initiated from the terminal.

Each transaction record in the database system 24 further includes account information of a payor in the respective transaction. This account information may be comprised of the card holder's account number, a bank identification code, and possibly further data.

Moreover, each transaction record includes one or more data fields to contain information on whether or not the respective transaction was successful or was rejected or later cancelled. In the case of PIN-based transactions, one such data field may indicate the answer code returned from the appropriate second authorization engine in response to the respective transaction request. In the case of signature-based transactions, the one or more data fields may indicate if the transaction was approved or rejected by the first authorization system 18 and—in case it was authorized and executed—if the transaction was later cancelled through a reverse transaction. Information on any reverse transactions may, e.g., be forwarded to the host server 14 from a bank's transaction processing system (not shown in the FIG. 1) involved in processing (and possibly reversing) the respective signature-based transaction. Through the inclusion of information on a possible later cancellation of a transaction, a transaction record for a signature-based payment transaction can indicate the eventual outcome of the transaction even after initial authorization thereof.

The authorization engine 22 applies one or more checking rules of the if-then clause type when analyzing a received authorization request for a signature-based payment transaction. Each checking rule includes one or more attribute threshold values associated with one or more transaction-related attributes referred to by the respective checking rule. The attribute threshold values may be stored in suitable memory (not shown in detail) in the first authorization system 18. There may be defined different attribute threshold values depending, e.g., on the particular merchant from which the authorization request is received or the industry sector or merchant category of the merchant. At least some of the attribute threshold values are set by a setting engine 26 using as an input parameter one or more characteristic values determined by an evaluation engine 28 of the first authorization system 18.

The evaluation engine 28 and the setting engine 26 are both designed to access the database system 24 and perform statistics on part or all of the records stored therein. Specifically, the evaluation engine 28 is configured to select a plurality of first sets of transaction records from the database system 24 and determine one or more temporal correlation factors in relation to each first set. The first sets are preferably non-overlapping, although some overlap of at least some of the first sets is conceivable. The evaluation engine 28 may select the first sets by the industry sector or merchant category if indicated in the transaction records or if derivable from other data in the transaction records. The setting engine 26 is designed to use the one or more temporal correlation factors to select a second set of transaction records from the database system 24 and determine at least one attribute threshold value based on the selected second set.

To be more precise, the evaluation engine 28 is designed to examine each first set to determine the number of cases satisfying the condition that the outcome of a payment transaction at a time $t_0$ was positive and the outcome of a previous transaction (preferably an immediately previous transaction) at an earlier time $t_0$ for the same payor account was negative. With PIN-based transactions, the answer code returned from the appropriate second authorization system 20 can be conveniently used to indicate the transaction outcome. As an example, the evaluation engine 28 may determine the number of cases where the answer code at time $t_0$ was 'AA', i.e., the transaction was successful, and the answer code at time $t_1$ was a "bad" one such as 'AD', i.e., the payment amount was inadmissibly high, e.g., because the card holder's account held insufficient funds. With signature-based transactions, the one or more data fields indicating if the transaction was approved or rejected and—in case it was authorized—if the transaction was later cancelled through a reverse transaction can be used to indicate the transaction outcome.

The evaluation engine 28 determines the above number for different time intervals between $t_0$ and $t_1$ for each first set of transaction records. Based on the numbers thus determined, the evaluation engine determines a correlation function that approximates the distribution of the determined numbers. To enhance understanding of this concept by way of non-limiting example, reference is made to FIG. 2. In this figure, graphs $G_1$ and $G_2$ schematically illustrate an exemplary variation of the number of cases satisfying the condition of a "good" transaction at time $t_0$ and a "bad" transaction at time $t_1$ for different values of the time interval $t_0$-$t_1$, and an exemplary exponential correlation function that approximates the curve $G_1$, respectively. Methods for approximating a given distribution of measurands by an exponential or other function are well known in the art and need not be explained in detail herein.

The evaluation engine 28 then determines a characteristic magnitude of each correlation function determined as above. In the case of an exponential approximation function, the evaluation engine 28 may determine a half-decay time of the exponential function. As a numerical example, a half-decay time of approximately 15 days may be found for an exponential correlation function that represents the time correlation between an answer code 'AD' in a previous PIN-based transaction and an answer code 'AA' in an immediately subsequent PIN-based transaction for the same payor account. One will understand that the characteristic magnitude thus determined may vary depending on the answer code pair considered, in particular the answer code considered for the previous transaction at time $t_1$. One will further appreciate that the characteristic magnitude may, and typically will, vary depending upon which first set of transaction records is considered. That is, as the shopping behavior, the payment scenario and the price level may differ among different industries or merchant categories, so may the transaction outcome correlation and, thus, the characteristic correlation length in the first sets. As a result, the evaluation engine 28 obtains at least one characteristic temporal correlation length for each first set of transaction records and stores the same in suitable memory (not shown in detail).

The setting engine 26, in order to determine an attribute threshold value for a checking rule, is designed to select one of the first sets of transaction records and retrieve the corresponding characteristic correlation length(s) as previously determined for that first set by the evaluation engine 28. Selection of an appropriate one of the first sets may, e.g., be in accordance with the industry sector or merchant category for which the checking rule is intended. Having selected the appropriate first set, the setting engine 26 may determine if there are more than one characteristic correlation lengths available for that first set. If yes, the setting engine 26 may select one of the characteristic correlation lengths, e.g., based on the particular transaction-related attribute for which an attribute threshold value is to be determined.

The setting engine 26 is further designed to select a second set of transaction records using a selected one of the various characteristic correlation lengths determined by the evaluation engine 28 as one selection criterion of a potential plurality of selection criteria. More specifically, the setting engine 26 selects the transaction records of the second set so that they cover a time span that is at least equal to the selected characteristic correlation length. Even more specifically, the setting engine 26 selects the transaction records of the second set so that they include, for each of a plurality of payor accounts, records from a most recent time period that extends at least over the characteristic correlation length. For example, given an applicable characteristic correlation length of, say, 15 days, the setting engine 26 selects the transaction records of the second set so that they include, for each of a plurality of payor accounts, transaction records from at least the last 15 days. Accordingly, the selected characteristic correlation length is a minimum requirement for the time span of the second set of transaction records. Of course, the setting engine 26 may include in the second set, transaction records from earlier than the minimum most recent time period, if desired or necessary.

The setting engine 26 may use one or more other selection criteria in addition to the characteristic correlation length to suitably select the records for the second set. One such additional selection criterion may, e.g., be a minimally required volume of transactions per day, week or other specified time period. Such minimum transaction volume may be obtained by the setting engine 26 through user input, or may alternatively be calculated by the setting engine 26 based on a predefined admissible statistical error deviation. It will be appreciated that further minimum requirements for the selection of transaction records for the second set may exist.

Having selected the second set of transaction records, the setting engine 26 is designed to determine a plurality of conditional probabilities $P\{A[a_i]|B[b_j], C[c_k], D[d_l] \ldots \}$ based on the records in the second set. In this expression, $A[a_i]$ represents a first transaction-related parameter having a realization $a_i$ and $B[b_j], C[c_k], D[d_l] \ldots$ represent one or more second transaction-related parameters B, C, D . . . having realizations $b_j, c_k, d_l \ldots$, respectively. Accordingly, $P\{A[a_i]|B[b_j], C[c_k], D[d_l] \ldots \}$ represents a probability of the occurrence of the realization $a_i$ of the first transaction-related parameter A under the condition of the realizations $b_j, c_k, d_l \ldots$ of the second transaction-related parameters B, C, D . . . .

In one embodiment, at least some of the conditional probabilities determined by the setting engine 26 involve a single second transaction-related parameter only. Accordingly, these conditional probabilities are of the form $P\{A[a_i]|B[b_j]\}$. In other embodiments, at least some of the conditional probabilities determined by the setting engine 26 involve two ore more second transaction-related parameters.

More specifically, the first transaction-related parameter A in the conditional probabilities preferably relates to the transaction outcome as defined further above, and the setting engine 26 determines the conditional probabilities as $P\{A=\text{"good"}|B[b_j], C[c_k], D[d_l] \ldots \}$, i.e., the probability of the occurrence of a "good" outcome of a transaction under the condition of the realizations $b_j$, $c_k$, $d_l$ ... of the second transaction-related parameters B, C, D .... With PIN-based payment transactions, the answer code contained in the records can be used as an indicator for the transaction outcome, and the setting engine 26 may refer to the answer code 'AA' as a "good" realization, for example. With records for signature-based payment transactions, the one or more data fields indicative of whether the corresponding authorization request was rejected or approved and whether a reverse transaction was executed can be used as an indicator for the transaction outcome.

The number of conditional probabilities to be determined by the setting engine 26 depends on the number of possible realizations (states, bins, values, ranges of values) considered for each second transaction-related parameter. For example, considering a case where the conditional probabilities are of form $P\{A=\text{"good"}|B[b_j]\}$ and ten different realizations are considered for the single second transaction-related parameter B, i.e., $j\in(1, \ldots 10)$, then ten conditional probabilities are determined by the setting engine 26. On the other hand, in the case of conditional probabilities of form $P\{A=\text{"good"}|B[b_j], C[c_k]\}$ and ten different realizations being considered for the parameter B (i.e., $j\in(1, \ldots 10)$) and fifteen different realizations being considered for the parameter C (i.e., $k\in(1, \ldots 15)$), the setting engine 26 determines a number 150 of conditional probabilities, one for each combination of realizations of the second parameters B and C.

In the following, various examples of conditional probabilities are given that may be determined by the setting engine 26. As a first example, the setting engine 26 may determine probabilities $P\{A=\text{"good"}|\text{outcome\_1 }[oc1_i]\}$, wherein the parameter 'outcome_1' refers to the outcome of an immediately previous transaction for the same payor account and $oc1_i$ specifies a particular realization of the attribute 'outcome_1'. Thus, the expression $P\{A=\text{"good"}|\text{outcome 1 }[oc1_i]\}$ is representative of a probability that a current payment transaction will have a "good" outcome under the condition that the outcome in a most recent transaction for the same payor account had the realization '$oc1_i$'. In a simple case, the parameter 'outcome_1' may only have two possible realizations, "good" and "bad". In other embodiments, different causes for a "bad" outcome of the previous transaction may be represented by different "bad" realizations of the parameter 'outcome_1'.

As a second example, the setting engine 26 may determine probabilities $P\{A=\text{"good"}|\text{transaction amount\_0 }[ta_i], \text{transaction time\_0 }[tt_j], \text{transaction date\_0 }[td_k]\}$, wherein the parameters 'transaction amount_0', 'transaction time_0' and 'transaction date_0' refer to the transaction amount, time and date of a current transaction and $ta_i$, $tt_j$, $td_k$ designate specific realizations (e.g., ranges of value) of these parameters. Thus, the expression $P\{A=\text{"good"}|\text{transaction amount\_0 }[ta_i], \text{transaction time\_0 }[tt_j], \text{transaction date\_0 }[td_k]\}$ designates a probability that a current transaction having amount $ta_i$, time $tt_j$ and date $td_k$ will have a "good" outcome.

As a third example, the setting engine 26 may determine probabilities $P\{A=\text{"good"}|\text{transaction amount\_0 }[ta_i], \text{transaction amount\_1 }[ta_j], \text{transaction amount\_2 }[ta_k]\}$, wherein the parameters 'transaction amount_1' and 'transaction amount_2' refer to the transaction amount in two immediately previous transactions for the same account and $ta_i$, $ta_k$ designate specific realizations of these parameters. Thus, the expression $P\{A=\text{"good"}|\text{transaction amount\_0 }[ta_i], \text{transaction amount\_1 }[ta_j], \text{transaction amount\_2 }[ta_k]\}$ designates a probability that a current transaction having amount $ta_i$ will have a "good" outcome under the condition that two immediately previous transactions for the same payor account had amounts $ta_j$ and $ta_k$, respectively.

As a further example, the setting engine 24 may determine probabilities $P\{A=\text{"good"}|\text{transaction number\_last week }[tn_i], \text{total transaction amount\_last week }[tta_j]\}$, wherein the parameter 'transaction number_last week' refers to the number of transactions for the mayor account as indicated in a currently considered transaction during the immediately previous week, and the parameter 'total transaction amount_last week' refers to the total transaction amount of transactions for that payor account during the same week. Accordingly, $P\{A=\text{"good"}|\text{transaction number\_last week }[tn_i], \text{total transaction amount\_last week }[tta_j]\}$ designates a probability that a current payment transaction will have a "good" outcome under the condition that the number of transactions for the same payor account during the last week was $tn_j$ and the total transaction amount for that payor account during the last week was $tta_j$.

A person of ordinary skill in the art will be able to readily conceive of numerous other conditional probabilities that may be determined by the setting engine 26, depending on the particular checking rule and the particular transaction-related attribute for which a threshold value is to be determined.

The conditional probabilities can be determined by the setting engine 26 in different ways. One way is through exact calculation, involving the counting of the number of occurrences of the various parameter realizations in the records of the second set. Other methods may resort to predictive modeling and may employ Naive Bayes networks or neural networks, which are generally known to those skilled in the art. The setting engine 26 effects storage of the conditional probabilities thus determined in suitable memory (not shown in detail).

The setting engine 26 is further configured to determine suitable attribute threshold values for at least part of the transaction-related attributes referred to in the checking rules based on the determined conditional probabilities. Consider as an example the following checking rule: "If the number of payment transactions for the same payor account as indicated in a currently received transaction authorization request in the last week is at least x and the total transaction amount for that payor account in the last week exceeds €y, then decline the requested authorization." In this rule, the variables 'x' and 'y' represent a threshold for the transaction-related attributes 'number of transactions in last week' and 'total transaction amount in last week', respectively. Consider further that the task of the setting engine 26 would be to find a suitable value for at least one of the variables 'x' and 'y' so that the authorization output of the authorization engine 22 becomes most reliable, i.e., the number of positive authorization outputs that eventually prove erroneous becomes minimum. This can be viewed as an optimization problem, and to tackle it the setting engine 26 may analyze the previously determined values of the above conditional probability $P\{A=\text{"good"}|\text{transaction number\_last week }[tn_i], \text{total transaction amount\_last week }[tta_j]\}$. The setting engine 26 may find, e.g., that the probability is relatively high for certain pairs of values (realizations) of the parameters 'transaction number_last week' and 'total transaction amount_last week', but is considerably lower for other pairs of values of these parameters. The setting engine 26 may is compare the various probability values with one or more pre-defined threshold levels to determine suitable values for 'x' and/or 'y'. Assuming as an example a probability threshold of 50%, the setting engine 26 may determine which, if any, pair or pairs of realizations of the parameters 'transaction number_last week' and 'total transaction amount_last week' yield a conditional probability below 50% and may set the parameters 'x' and/or 'y' so as to correspond to the pair or one of the pairs thus found. One will appreciate that the probability threshold may vary for different attribute threshold values to be set.

The invention claimed is:

1. A transaction authorization system, comprising:
a computer database system storing transaction records for a plurality of past electronic payment transactions, wherein each transaction record in the database system includes a payor account identifier;
A computer programmed to:
perform an analysis in relation to a received request for authorization of an electronic payment transaction and determine an authorization output based on the analysis, the computer configured to receive one or more transaction-related attributes associated with the electronic payment transaction, the analysis including application of one or more checking rules of the if-then clause type comparing one or more of the transaction-related attributes to one or more predefined attribute threshold values; and
programmed to access the database system and evaluate a first set of stored transaction records to determine one or more characteristic values related to the first set; wherein the characteristic values include one or more correlation values indicative of a transaction outcome correlation function, the correlation value determined from the first set of transaction records as follows:
  a. determining a length of time between a first transaction and a second transaction in the first set of transaction records, wherein the first transaction at a first time had a negative outcome and the second transaction at a second time had a positive outcome, wherein the first transaction and the second transaction are for the same payor account,
  b. repeating the determination of a length of time for at least a third transaction and a fourth transaction to create a distribution of the lengths of time;
  c. determining one or more transaction outcome correlation functions based on the distribution of the lengths of time, wherein the transaction outcome correlation function provides a conditional probability for predicting the outcome of a transaction according to one or more of the transaction-related attributes;
  d. determining a characteristic magnitude associated with the value of the conditional probability for a successful outcome; and
  e. setting the characteristic magnitude of the one or more transaction outcome correlation functions as a respective correlation value;
and
programmed to access the database system and select a second set of stored transaction records to span a time period satisfying a predetermined condition in relation to a temporal correlation length represented by at least one of the one or more correlation values, and
programmed to evaluate the selected second set of transaction records and set at least one of the attribute threshold values in at least one of the checking rules based on the evaluation of the second set of transaction records.

2. The transaction authorization system of claim 1, wherein the computer is configured to select the second set of transaction records to span a time period at least equal to the temporal correlation length represented by at least one of the one or more correlation values.

3. The transaction authorization system of claim 1, wherein the computer is configured to re-select a plurality of first sets of transaction records and determine one or more characteristic values in relation to each selected first set, and wherein the computer is configured to select the second set of transaction records in accordance with one or more characteristic values determined in relation to a selected one of the first sets of transaction records.

4. The transaction authorization system of claim 3, wherein the computer is configured to re-select the plurality of first sets of transaction records at predetermined time intervals or whenever a predetermined number of transaction records have been newly recorded in the database system and re-determine the one or more characteristic values in relation to each re-selected set.

5. The transaction authorization system of claim 3, wherein the computer is configured to select the first sets of transaction records based on payee-related information in the transaction records.

6. The transaction authorization system of claim 1, wherein the computer is configured to perform the analysis in relation to a received request for authorization of a first-type payment transaction, wherein the transaction records stored in the database system include transaction records for second-type payment transactions, and wherein the computer is configured to include transaction records for second-type payment transactions in the first set wherein the computer is configured to include transaction records for second-type payment transactions in the second set.

7. The transaction authorization system of claim 6, wherein the transaction records for second-type payment transactions each include a transaction request answer code generated by a remotely located further transaction authorization system, and wherein the computer is configured to evaluate the first set by referring to the transaction request answer code in the transaction records for second-type payment transactions included in the first set or wherein the computer is configured to evaluate the selected second set by referring to the transaction request answer code in the transaction records for second-type payment transactions included in the selected second set.

8. The transaction authorization system of claim 1,
wherein the computer is configured to determine at least one attribute threshold value, the attribute threshold value equal to a conditional probability of a positive outcome for a transaction based on the value of a transaction-related parameter, wherein the transaction-related parameter is related to the transaction-related attribute.

9. A transaction authorization method, comprising the following steps, each executed by a computer:
receiving a request for authorization of an electronic payment transaction, wherein the request includes one or more transaction-related attributes associated with the electronic payment transaction;
performing an analysis in relation to the received authorization request and determining an authorization output based on the analysis, the analysis including application of one or more checking rules of the if-then clause type comparing one or more of the transaction-related attributes to one or more predefined attribute threshold values;
accessing a database system storing transaction records for a plurality of past electronic payment transactions wherein each transaction record in the database system includes a payor account identifier;
evaluating a first set of stored transaction records to determine one or more characteristic values related to the first set wherein the characteristic values include one or more correlation values indicative of a transaction outcome correlation function, the correlation value determined from the first set of transaction records as follows:
  a. determining a length of time between a first transaction and a second transaction in the first set of transaction records, wherein the first transaction at a first time had a negative outcome and the second transaction at a second time had a positive outcome, wherein the first transaction and the second transaction are for the same payor account;
  b. repeating the determination of a length of time for at least a third transaction and a fourth transaction to create a distribution of the lengths of time;
  c. determining one or more transaction outcome correlation functions based on the distribution of the lengths of time, wherein the transaction outcome correlation function provides a conditional probability for predicting the outcome of a transaction according to one or more of the transaction-related attributes;
  d. determining a characteristic magnitude associated with the value of the conditional probability for a successful outcome; and
  e. setting the characteristic magnitude of the one or more transaction outcome correlation functions as a respective correlation value;

selecting the second set of transaction records to span a time period satisfying a predetermined condition in relation to a temporal correlation length represented by at least one of the one or more correlation values;

evaluating the selected second set of transaction records; and setting at least one of the attribute threshold values in at least one of the checking rules based on the evaluation of the second set of transaction records.

10. The transaction authorization method of claim 9, further comprising:
  selecting the second set of transaction records to span a time period at least equal to the temporal correlation length represented by at least one of the one or more correlation values.

11. The transaction authorization method of claim 9, further comprising:
  selecting a plurality of first sets of transaction records; and
  determining one or more characteristic values in relation to each selected first set, selecting the second set of transaction records in accordance with one or more characteristic values determined in relation to a selected one of the first sets of transaction records.

12. The transaction authorization method of claim 11, further comprising:
  re-selecting the plurality of first sets of transaction records at predetermined time intervals or whenever a predetermined number of transaction records have been newly recorded in the database system; and
  re-determining the one or more correlation values in relation to each re-selected set.

13. The transaction authorization method of claim 11, further comprising: selecting the first sets of transaction records based on payee-related information in the transaction records.

14. The transaction authorization method of claim 9, wherein the transaction records stored in the database system include transaction records for second-type payment transactions, further comprising:
  performing the analysis in relation to a received request for authorization of a first-type payment transaction; and including transaction records for second-type payment transactions in the first set or including transaction records for second-type payment transactions in the second set.

15. The transaction authorization method of claim 14, wherein the transaction records for second-type payment transactions each include a transaction request answer code generated by a remotely located further transaction authorization system further comprising:
  evaluating the first set by referring to the transaction request answer code in the transaction records for second-type payment transactions included in the first set; or
  evaluating the selected second set by referring to the transaction request answer code in the transaction records for second-type payment transactions included in the selected second set.

16. The transaction authorization method of claim 9, further comprising:
  determining one or more conditional probabilities in relation to the selected second set and setting the at least one attribute threshold value based on the one or more conditional probabilities, the conditional probabilities indicative of a probability of one or more realizations of one or more first transaction-related parameters under the condition of one or more realizations of one or more second transaction-related parameters.

17. A computer readable medium having stored thereon computer program instructions that when executed, cause a computer processor to perform a method for authorizing a transaction, the method comprising:
  receiving a request for authorization of an electronic payment transaction, wherein the request includes one or more transaction-related attributes associated with the electronic payment transaction;
  performing an analysis in relation to the received authorization request and determining an authorization output based on the analysis, the analysis including application of one or more checking rules of the if-then clause type comparing one or more of the transaction-related attributes to one or more predefined attribute threshold values;
  accessing a database system storing transaction records for a plurality of past electronic payment transactions wherein each transaction record in the database system includes a payor account identifier;
  evaluating a first set of stored transaction records to determine one or more characteristic values related to the first set, wherein the characteristic values include one or more correlation values indicative of a transaction outcome correlation function, the correlation value determined from the first set of transaction records as follows:
    a. determining a length of time between a first transaction and a second transaction in the first set of transaction records, wherein the first transaction at a first time had a negative outcome and the second transaction at a second time had a positive outcome, wherein the first transaction and the second transaction are for the same payor account;
    b. repeating the determination of a length of time for at least a third transaction and a fourth transaction to create a distribution of the lengths of time;
    c. determining one or more transaction outcome correlation functions based on the distribution of the lengths of time, wherein the transaction outcome correlation function provides a conditional probability for predicting the outcome of a transaction according to one or more of the transaction-related attributes;

d. determining a characteristic magnitude associated with the value of the conditional probability for a successful outcome; and e. setting the characteristic magnitude of the one or more transaction outcome correlation functions as a respective correlation value;

selecting the second set of transaction records to span a time period satisfying a predetermined condition in relation to a temporal correlation length represented by at least one of the one or more correlation values;

evaluating the selected second set of transaction records; and setting at least one attribute threshold value in at least one checking rule based on the evaluation of the second set of transaction records.

* * * * *